United States Patent [19]

Day

[11] Patent Number: 4,474,080
[45] Date of Patent: Oct. 2, 1984

[54] DIFFERENTIAL WITH VARIABLE TORQUE MEANS

[75] Inventor: Ralph R. Day, Aurora, Ill.

[73] Assignee: Caterpillar Tractor Co., Peoria, Ill.

[21] Appl. No.: 872,535

[22] Filed: Jan. 26, 1978

[51] Int. Cl.³ .................. F16H 1/44; F16D 43/21
[52] U.S. Cl. ................... 74/711; 192/56 R; 464/46
[58] Field of Search .......... 74/711, 720, 710.5, 74/664, 665 R; 64/30 R, 30 C; 192/56 R, 150; 464/46

[56] References Cited

U.S. PATENT DOCUMENTS

| | | | |
|---|---|---|---|
| 1,618,987 | 3/1927 | Lescarts | 64/30 C |
| 1,739,947 | 12/1929 | Chilton | 64/30 C |
| 1,750,981 | 3/1930 | Wildhaber | 74/711 |
| 2,234,591 | 3/1941 | Fitzner | 74/711 |
| 2,561,913 | 7/1951 | Dodge | 64/30 R X |
| 2,587,712 | 3/1952 | Dodge | 64/30 R X |
| 2,731,856 | 1/1956 | Spatta | 74/720 |
| 3,118,292 | 1/1964 | Schroter et al. | 64/30 C |
| 3,261,230 | 7/1966 | Rudnicki | 74/710.5 |
| 3,264,901 | 8/1966 | Ferbitz et al. | 74/711 |
| 3,277,671 | 10/1966 | Winstore et al. | 64/30 R |
| 3,457,807 | 7/1969 | Altmann | 74/711 |
| 3,580,108 | 5/1971 | Mieras | 74/711 |
| 3,929,036 | 12/1975 | Shealy | 74/711 |

FOREIGN PATENT DOCUMENTS

| | | | |
|---|---|---|---|
| 1330857 | 5/1963 | France | 74/711 |
| 35800 | 3/1954 | Poland | 74/711 |
| 375006 | 6/1932 | United Kingdom | 64/30 C |
| 853197 | 11/1960 | United Kingdom | 74/720 |
| 1021379 | 3/1966 | United Kingdom | 64/30 C |
| 1394154 | 5/1975 | United Kingdom | 64/30 R |

Primary Examiner—Allan D. Herrmann
Attorney, Agent, or Firm—Wood, Dalton, Phillips, Mason & Rowe

[57] ABSTRACT

A drive mechanism wherein a first rotatable drive portion is connected to a second rotatable drive portion by a clutch. One of the drive portions is provided with a first part drivingly connected to a second part by a meshed interconnecting structure arranged to maintain an effectively positive driving connection between the parts notwithstanding play movement between the interconnected parts. In one form the first drive portion defines a planetary differential gear and the second drive portion includes an axle carrying a side gear in meshing relationship with the planetary gear. The side gear is splined to the axle and releasably connected to a carrier by the clutch. In another form the first and second drive portions define coaxial shafts.

6 Claims, 4 Drawing Figures

DIFFERENTIAL WITH VARIABLE TORQUE MEANS

BACKGROUND OF THE INVENTION

1. Field of the Invention

This invention relates to drive mechanisms and in particular to a drive means having a variable torque differential.

2. Description of the Prior Art

In U.S. Letters Pat. No. 3,929,036 of Noah A. Shealy, a limited slip differential with negligible bias under light load conditions is shown to comprise a gear differential of the limited slip type wherein spring or biasing means exerts a predetermined force. The biasing means is interposed between the outer ends of the side gears and adjacent portions of the differential carrier housing for urging each side gear in a direction opposite to the direction of the axial force applied to the side gear through the planetary gear thereby normally tending to urge the clutch friction discs into disengagement as long as the predetermined force is greater than the axial force, thereby permitting a high differential bias under heavy drawbar conditions and a relatively low bias under the light drawbar conditions.

SUMMARY OF THE INVENTION

The present invention comprehends an improved limited slip differential wherein the biasing means is arranged to function in an opposite manner to that of the above discussed Shealy patent so as to load the clutch under normal driving conditions. However, when a large torque load is applied between the planetary gear and the side gear causing the gear teeth to tend to separate, a force is applied to the biasing means so as to release the clutch and thereby prevent damage to the apparatus during full torque conditions.

In the illustrated embodiment the biasing means comprises a Belleville spring.

In one form the Belleville spring is engaged with a pivot splined to the side gear to have limited axial movement relative to the side gear.

In another form the drive is defined by a pair of coaxial shafts interconnected by a suitable clutch and with the biasing means arranged to cause the clutch to hold at relatively low torques and to release at a higher torque exceeding the preselected value. In the second form the drive mechanism is adapted for use with hydrostatic steering controls and is arranged to maintain a straight driving of the machine until actual steering force is applied.

More specifically, in one form the invention comprehends an improved drive mechanism including a first rotatable drive portion, a second rotatable drive portion having a first part drivingly connected to a second part by meshed interconnecting means arranged to maintain effectively positive driving connection between the parts notwithstanding play movement between the interconnecting means, a clutch having first plate means rotatable with the first drive portion and second plate means rotatable with the second part of the second drive portion. Means are provided for biasing the second clutch plate means to urge the clutch plates to be facially engaged and permitting disengagement of the clutch plates as a result of play movement of the second drive portion parts tending to separate the parts.

In one form the drive mechanism includes a planetary pinion gear, a drive axle provided with a side gear splined to the axle in driven meshed relationship to the pinion gear, a clutch having adjustably juxtaposed clutching elements including a first element rotatable with the pinion gear and a second element rotatable with the drive gear, biasing means for biasing the clutch elements to engage disposition, and disengaging means responsive to an application of a predetermined high torque force by the pinion gear to the side gear for disengaging the clutch elements.

In another form the drive mechanism includes a pair of coaxial rotatable drive shafts with the second of the drive shafts having meshed interconnecting means for interconnecting two parts thereof in maintained positive driving connection while permitting play movement therebetween.

In the different forms of the invention, the means for biasing the clutch may comprise a Belleville spring acting coaxially in loading the clutch pack.

Thus the drive mechanism of the present invention is extremely simple and economical of construction while yet providing a highly improved means of providing controlled loading of a clutch pack therein in a normal and simple manner.

BRIEF DESCRIPTION OF THE DRAWINGS

Other features and advantages of the invention will be apparent from the following description taken in connection with the accompanying drawing wherein.

DESCRIPTION OF THE PREFERRED EMBODIMENT

Figure 1:
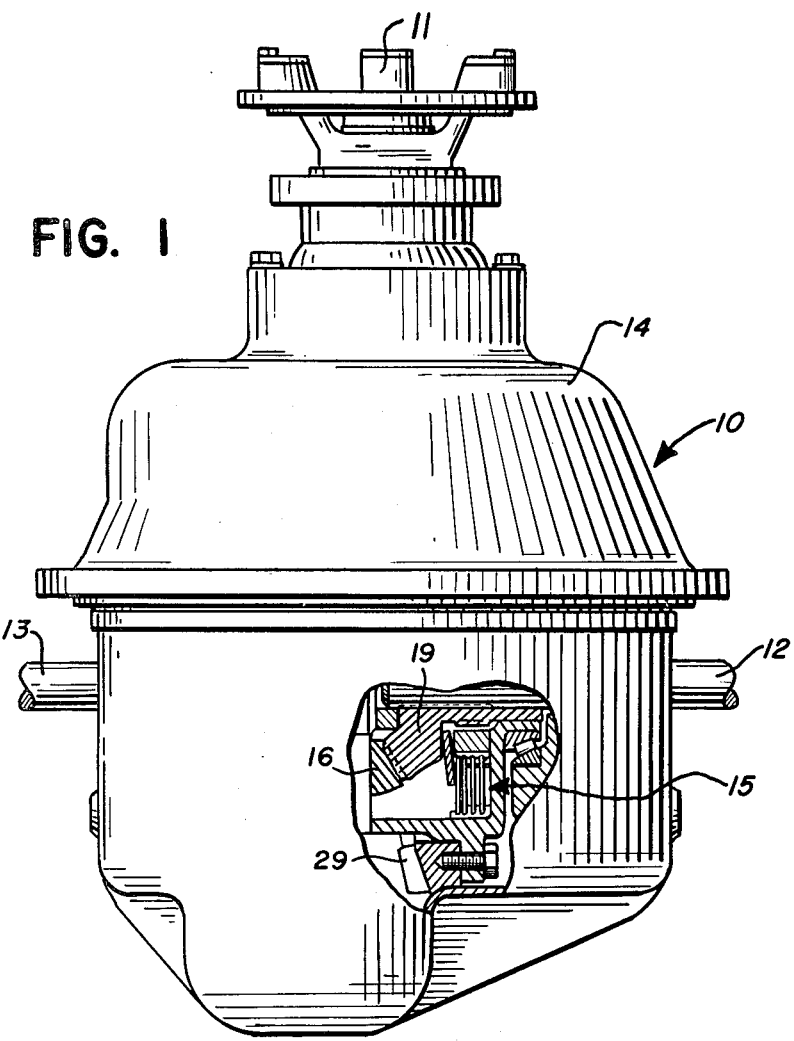
FIG. 1 is a fragmentary side elevation of a drive mechanism having means for controlling the clutch thereof embodying the invention.
Figure 2:
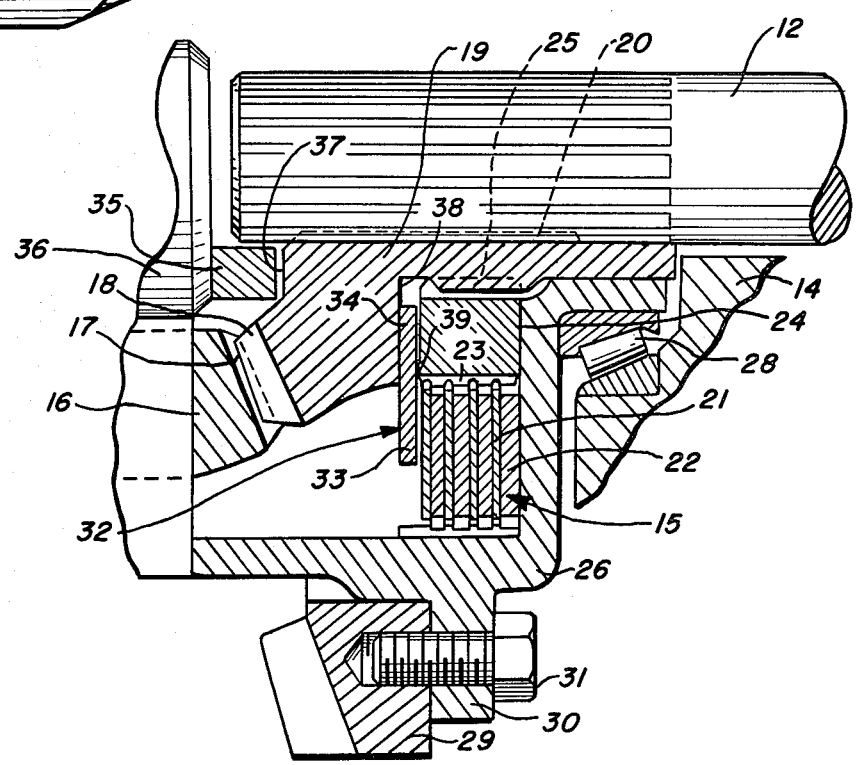
FIG. 2 is a fragmentary enlarged section illustrating the means for controlling the clutch in greater detail.

In the exemplary embodiment of the invention as disclosed in FIGS. 1 and 2 of the drawings, a drive mechanism generally designated 10 is arranged to provide a drive from an input shaft 11 to a pair of opposed axles 12 and 13. The drive mechanism is enclosed in an outer housing 14 and includes a clutch pack generally designated 15.

The drive mechanism includes a planetary differential gear 16 having teeth 17 meshing with teeth 18 of a side gear 19 splined by means of spline 20 to the axle 12 as shown in FIG. 2. Gear 16 is similarly associated with the axle 13 as will be obvious to those skilled in the art.

Clutch pack 15 includes a plurality of interleaved clutch plates 21 and 22. Conventional means (not shown) may be provided for controlling the engagement of the interleaved clutch plates in the normal manner. As shown in FIG. 2, clutch plates 21 are splined by means of spline 23 to a mounting block 24 splined to side gear 19 by a spline 25. Clutch plates 22 are splined to the mechanism carrier 26 by means of a spline 27 on the carrier. A suitable carrier bearing 28 is provided for rotatably mounting the carrier to the housing 14. A ring gear 29 may be bolted to a flange 30 of the carrier by simple means such as bolts 31.

The present invention comprehends providing a Belleville spring 32 having a first portion 33 engaging clutch pack 15 and a second portion 34 engaging a shoulder 38 of the side gear 19. A spacer 35 is provided between the spider 36 carrying the gear 16 and an end surface 37 of the side gear so as to limit the amount of pressure applied by spring 32 against the clutch pack.

Mounting block 24 defines a projecting pivot 39 serving as a fulcrum for the spring 32. In the illustrated embodiment the pivot projects approximately 0.010 to 0.015 inches.

Under normal operating conditions teeth 17 and 18 of gears 16 and 19, respectively, are in normal meshed relationship as shown in FIG. 1. However, when a substantial torque load is applied between the gears the teeth 17 and 18 tend to separate thereby causing the spring portion 34 to move axially to the right as seen in FIG. 2 whereby the spring is pivoted on pivot 39 to urge the portion 33 of the spring away from the clutch pack 15 and thereby release the clutch under such high torque conditions. As will be obvious to those skilled in the art the release of the clutch is a function of the amount of separation force supplied between the gear teeth 17 and 18 and thus the amount of pivoting of spring 32 and release of the pressure against the clutch pack varies infinitely between the applied clutch condition of FIG. 1 and the released clutch condition of FIG. 2. Thus under low torque conditions an essentially locked differential arrangement is provided. Under medium torque conditions a partially locked arrangement is provided and under high torque conditions a completely unlocked differential arrangement is provided. This functioning is obtained automatically as a result of a variation in the torque load transmitted between teeth 17 and 18 and provides improved functioning of the drive apparatus to prevent damage of the apparatus during full torque conditions.

As indicated briefly above, the Bellville spring of the invention functions in a reversed manner to that of the prior art structure exemplified by the Shealy U.S. Pat. No. 3,929,036. Shown in FIG. 2, the pivot 39 may be spaced from the center of the spring 32 so that a force multiplication is provided as a result of the relatively short length of the portion 34 to the relatively long length of the portion 33 at opposite sides of the pivot 39. As will be obvious to those skilled in the art any suitable force multiplication or elimination of a force multiplication by a centered disposition of the pivot may be utilized as desired.

Figure 3:
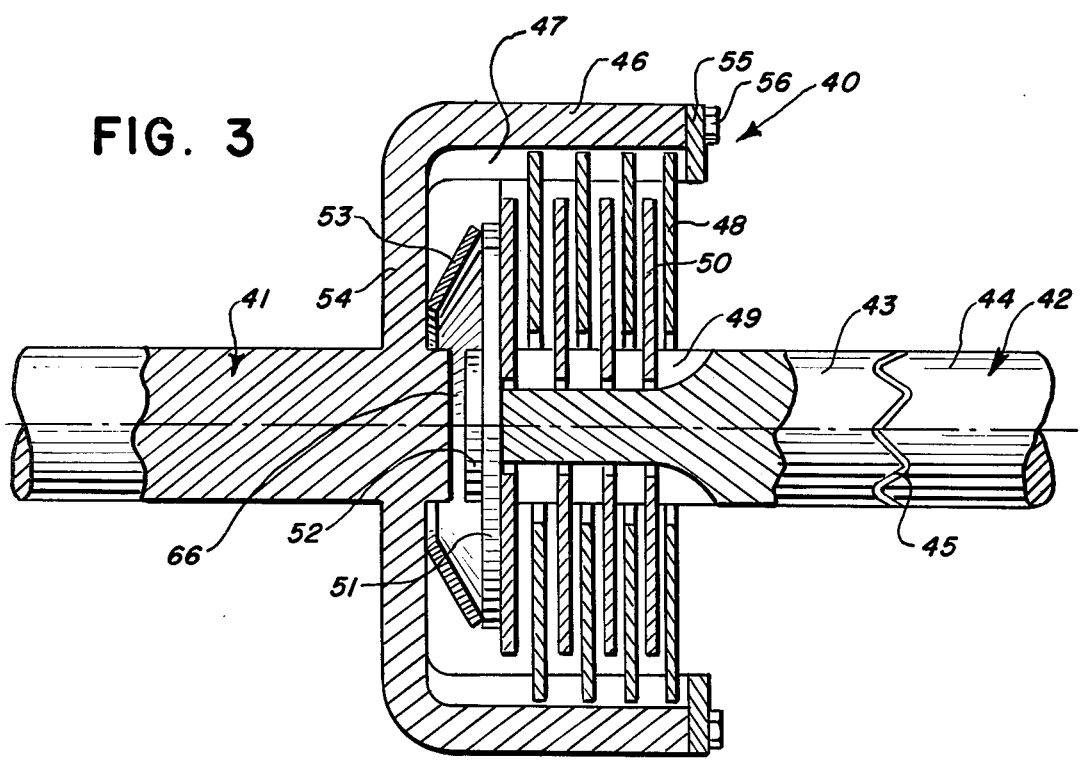
FIG. 3 is a side elevation illustrating another form of clutch control means embodying the invention.
Figure 4:
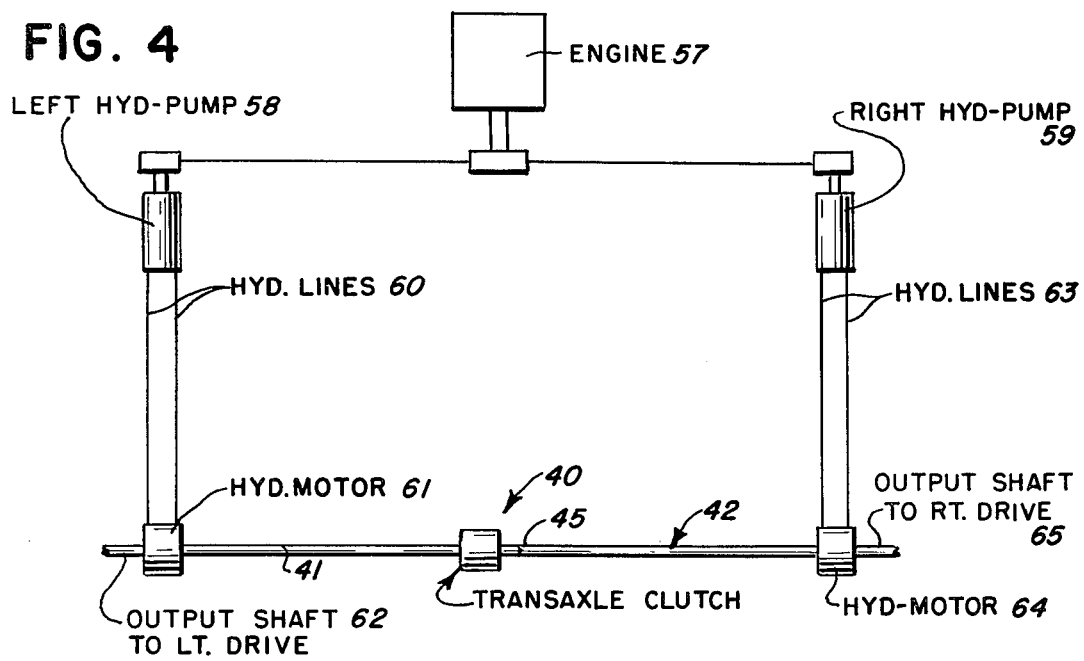
FIG. 4 is a schematic showing of the hydraulic circuitry of an apparatus utilizing the transaxial clutch means of FIG. 3.

Referring now to the embodiment of FIGS. 3 and 4, a modified form of clutch mechanism generally designated 40 is provided for controlling the delivery of torque from a shaft 41 to a shaft 42. Shaft 42 includes an inner part 43 and an outer part 44 drivably connected by inner meshed teeth 45.

Shaft 41 is provided with a clutch housing portion 46 defining a spline 47 to which a first plurality of clutch plates 48 are splined.

The distal end of shaft part 43 is provided with a spline 49 to which are splined a second plurality of clutch plates 50. As shown in FIG. 3 clutch plates 48 and 50 are interleaved and suitable means (not shown) may be provided as will be obvious to those skilled in the art for effecting suitable relative movement therebetween for engaging and disengaging the clutch as desired.

A pressure plate 51 may be secured to the distal end of shaft part 43 by suitable means such as screw 52. A Belleville spring 53 is disposed between the pressure plate 51 and a radial wall portion 54 of housing 46 thereby biasing the clutch plates into engagement so as to provide a driving connection between shaft 41 and shaft 42.

A suitable retaining ring 55 may be secured to the distal end of the housing 46 by suitable bolts 56 for backing up the clutch pack against the action of the spring 53.

As indicated above the clutch 40 may be utilized in connection with a drive system of a hydrostatic machine. Such an installation is illustrated in FIG. 4 wherein an engine 57 drives a left hydraulic pump 58 and a right hydraulic pump 59. Fluid from pump 58 is delivered through suitable hydraulic line 60 to a left hydraulic motor 61 driving the output shaft 62 of the left drive of the motor. Hydraulic pump 59 delivers hydraulic fluid through hydraulic line 63 to the hydraulic motor 64 driving the output shaft 65 of the right drive of the apparatus. Motor 61 concurrently drives shaft 41 and motor 64 concurrently drives shaft 42 with clutch 40 interposed therebetween as discussed above.

The clutch mechanism 40 functions generally similarly to the clutch mechanism of the embodiment of FIGS. 1 and 2. Thus whenever the torque on shaft 41 exceeds a preselected value as determined by the loading of spring 53 on the clutch plates, the meshed teeth 45 tend to separate thereby causing a leftward movement of the shaft portion 43 urging the plate 51 leftwardly and thereby relieving the pressure of the Belleville spring against the clutch to at least partially release the clutch. As shown in FIG. 3, the clearance 66 between screw 52 and the inner end of shaft 41 is such that shaft bar 43 may not move sufficiently to the left to disengage the teeth 45 at any time.

Thus in normal operation of the drive system clutch mechanism 40 assures a straight-ahead movement of the apparatus by maintaining synchronization of the left and right hydraulic motor 62 and 64. However, when it is desired to turn the apparatus the application of a torque differential between the drive 62 and 64 causes a disengaging of the clutch as discussed above to permit the desired turning of the vehicle or apparatus as desired.

As indicated briefly above, suitable optional means may be provided for releasing the clutch when steering is desired.

Thus the Belleville spring 53 functions generally similarly to the Belleville spring 32 of the first described embodiment in normally biasing the clutch pack to an engaged position while permitting disengagement of the clutch plates of a function of a torque applied to force transmitting intermeshed teeth in the drive system. The improved apparatus provides an automatic control of the clutch for preventing damage to the apparatus and facilitating steering operation therein.

The foregoing disclosure of specific embodiments is illustrative of the broad invention concepts comprehended by the invention.

The embodiment of the invention in which an exclusive property or privilege is claimed is defined as follows:

1. A drive mechanism comprising:
    an output drive portion;
    a second rotatable drive portion having a first, driver gear driving a second, driven gear, said gears being arranged to maintain an effectively positive drive therethrough notwithstanding play movement therebetween;

a clutch having first plate means rotatable with said output drive portion, and second plate means; and a biasing spring biasing said first clutch plate means to urge said first and second plate means to be facially engaged, said spring being operatively associated with said second gear to cause the biasing force to be reduced as a direct function solely of the amount of play movement between said gears thereby causing disengagement of said plate means solely as a result of play movement of said second gear away from said first gear, said biasing means comprising a Belleville spring having an outer portion engaging said second clutch plate means and an inner portion engaged by said second gear.

2. A drive mechanism comprising:
a planetary pinion gear;
a carrier;
a drive axle provided with a side gear splined to said axle in driven meshed relationship to said pinion gear;
a clutch having adjustably juxtaposed clutching elements including a first element rotatable with said side gear and a second element rotatable with said carrier;
a Belleville spring having a first portion movable with said side gear and a second portion engaging said clutch for biasing said clutch elements to engaged disposition; and
pivot means for pivotally supporting the spring intermediate said first and second portions to cause said spring to be responsive solely to an application of a predetermined high torque force by said pinion gear to said side gear for causing the biasing force to be reduced as a direct function solely of the amount of play movement between said gears and thereby releasing said clutch elements.

3. The drive mechanism of claim 2 wherein said pinion gear and side gear are bevel gears having a predetermined backlash.

4. The drive mechanism of claim 2 wherein said pivot means is rotatable with said side gear.

5. The drive mechanism of claim 2 wherein said pivot means is splined to said side gear.

6. The drive mechanism of claim 2 wherein means are provided for limiting the movement of said side gear toward said pinion gear to provide a preselected backlash therebetween, said spring urging said gears to said preselected backlash disposition.

* * * * *